US008686372B2

(12) United States Patent
Missalla et al.

(10) Patent No.: US 8,686,372 B2
(45) Date of Patent: Apr. 1, 2014

(54) METHOD FOR THE SPATIALLY RESOLVED MEASUREMENT OF PARAMETERS IN A CROSS SECTION OF A BEAM BUNDLE OF HIGH-ENERGY RADIATION OF HIGH INTENSITY

(75) Inventors: Thomas Missalla, Jena (DE); Max Christian Schuermann, Luebbecke (DE); Denis Bolshukhin, Goettingen (DE); Boris Tkachenko, Hannover (DE)

(73) Assignee: USHIO Denki Kabushiki Kaisha, Tokyo-to (JP)

( * ) Notice: Subject to any disclaimer, the term of this patent is extended or adjusted under 35 U.S.C. 154(b) by 174 days.

(21) Appl. No.: 13/307,244

(22) Filed: Nov. 30, 2011

(65) Prior Publication Data

US 2012/0138805 A1    Jun. 7, 2012

(30) Foreign Application Priority Data

Dec. 2, 2010 (DE) .......................... 10 2010 053 323

(51) Int. Cl.
*G01T 1/29* (2006.01)
(52) U.S. Cl.
USPC ........................................................ 250/393
(58) Field of Classification Search
CPC ..... G01T 1/2914; G01T 1/2964; G21K 1/043
USPC .............. 378/146; 348/209.99, 199; 250/393
See application file for complete search history.

(56) References Cited

U.S. PATENT DOCUMENTS 1,838,537 A * 12/1931 Dauvillier ..................... 378/98.2
2,837,657 A *  6/1958 Craig Dwin R et al. ....... 378/108
4,686,695 A *  8/1987 Macovski ..................... 378/146
4,828,384 A     5/1989 Plankenhorn et al.
4,894,851 A *  1/1990 Kroon et al. ................. 378/98.2
4,916,319 A     4/1990 Telfair et al.
4,933,710 A *  6/1990 Beaulieu et al. ............... 355/38
7,023,524 B2    4/2006 Van Dijsseldonk et al.

FOREIGN PATENT DOCUMENTS

| DD | 147 153 A1 | 3/1981 |
|---|---|---|
| DE | 3005352 A1 | 8/1981 |
| DE | 82 27 494 U1 | 2/1983 |
| DE | 249 759 A1 | 9/1987 |
| DE | 19841083 A1 | 4/2000 |
| DE | 102007029923 A1 | 1/2009 |
| FR | 2 574 542 A1 | 6/1986 |
| JP | 2005 017 106 A | 1/2005 |

OTHER PUBLICATIONS

Kerr, J. R., Novel and elegant spiral for a simple laser profilometer, Optical Engineering, Oct. 1996, pp. 3048-3050, vol. 35, No. 10, Society of Photo-Optical Instrumentation Engineers.
Search Report from the Dutch counterpart Application No. NL2007739, mailed May 31, 2013.

* cited by examiner

*Primary Examiner* — Constantine Hannaher
(74) *Attorney, Agent, or Firm* — Patentbar International, P.C.

(57) ABSTRACT

Spatial acquisition of measurement data over a cross section of a high-energy, high-intensity radiation beam bundle without impairment of measuring accuracy due to saturation or degradation of detectors occurs by imaging an entire cross section of the beam bundle on a shading element, the cross section being separated successively into partial beam bundles having reduced cross sections and reduced intensity through movement of at least one opening, whereby measurement values of the partial beam bundles passing the opening are associated temporally and spatially with positions of the opening.

17 Claims, 7 Drawing Sheets

METHOD FOR THE SPATIALLY RESOLVED MEASUREMENT OF PARAMETERS IN A CROSS SECTION OF A BEAM BUNDLE OF HIGH-ENERGY RADIATION OF HIGH INTENSITY

RELATED APPLICATIONS

This application claims priority to German Patent Application No. DE 10 2010 053 323.8, filed Dec. 2, 2010, which is incorporated herein by reference in its entirety.

FIELD OF THE INVENTION

The invention is directed to a method and an arrangement for spatial acquisition of measurement data (parameters) over the cross section of a bundle of high-energy, high-intensity radiation. It is preferably used in the measurement of high-energy beam bundles for the machining of workpieces to prepare spatial profiles of acquired radiation parameters.

High-energy radiation, e.g., laser radiation, extreme ultraviolet (EUV) radiation, or particle radiation (electron beams or ion beams), is increasingly used for non-contact machining of workpieces such as, for example, semiconductor wafers which are structured by means of lithography processes. For efficient use of high-energy radiation of this kind, it is very important to measure particularly parameters such as the spatial distribution of energy, i.e., the intensity (power per unit area and time) of the radiation, over the cross section of a machining beam (hereinafter: beam bundle) so that inhomogeneities can be corrected or the effects thereof can be compensated during the progress of machining.

BACKGROUND OF THE INVENTION

At present, spatial measurement of beam bundles is mostly carried out by means of optoelectronic sensors such as, e.g., individual or arrayed photodiodes, CCD detectors and CMOS detectors, or cameras arranged behind fluorescent screens, or photon counters. In so doing, the radiation impinging on the sensor as input signal produces an electric output signal; the functional relationship between the input signal strength and output signal strength is described by a characteristic curve specific to each detector and type of radiation (particle type, wavelength).

Characteristic curves of optoelectronic sensors have a linear relationship between the input signal and output signal, typically over a range suitable for technical measurement purposes. Depending on the way in which the sensors operate, the characteristic passes after a certain value of the input signal into a saturation state which is not suitable for measuring purposes.

As increasingly powerful radiation sources are developed, measurement of radiation quantities in short-wavelength ionizing radiation, even at powers of >100 W, require much more robust sensors which must nevertheless be sufficiently sensitive to slight power fluctuations.

When sensors are used for measuring purposes of this kind, e.g., for soft X-ray radiation (EUV), the high radiation energies and intensities quickly lead to saturation or even destruction, e.g., due to high heat development in the sensors. The use of optical attenuators such as absorption filters between the radiation source and the sensor is also possible only to a limited extent because of high heat development.

For these reasons, intensities within a beam bundle of high-energy radiation such as UV, DUV, EUV, X-ray, or laser radiation are usually measured indirectly.

U.S. Pat. No. 7,023,524 B2, for example, describes the arrangement of movable apertures for deliberate patterning of the beam in or near an intermediate focus in the beam path. Edge beams, known as "out-of-field" beams, are acquired by a photodiode and the intensity of the radiation is determined therefrom. However, only an equivalent of the total intensity of the source, and not a distribution of intensities over the cross section of the beam bundle, is determined by this variant of radiation measurement, since the determined value does not originate from the region of the beam bundle used for machining. In order to overcome this deficiency an indirect method for measuring the intensity distribution over the cross section of the beam bundle is proposed, wherein the electrical resistance or other electrical parameters which vary as a result of the heating during irradiation are measured at the moving apertures, and an intensity profile is derived therefrom. However, this solution achieves only a spatial resolution in the dimension of the size of the apertures.

In order to take measurements inside the beam bundle and to carry this out while machining of a workpiece is in progress, DE 82 27 494 U1 discloses an arrangement in which only a small fraction of the laser cross section is coupled out stripewise to a measuring device through reflection so that measurement is possible during laser cutting of a workpiece. To this end, a reflecting round rod is moved on a circular path through the beam path. Since the relative position of the reflector in relation to the beam bundle is known at all times, the respective measurement values obtained can be spatially associated with a stripe-shaped section of the beam bundle.

However, these measurement data of the beam bundle by way of the respective stripes are averaged values and therefore cannot yield intensity values with high point-by-point resolution.

SUMMARY OF THE INVENTION

It is the object of the invention to find a novel possibility for radiation measurement within the cross section of a beam bundle of high-energy, high-intensity radiation which permits highly spatially resolved measurement data to be acquired with conventional optoelectronic sensors without, as a result of high radiation loading, impairing the measuring accuracy through saturation or degradation of the sensors or through parameter fluctuations of attenuators or reflecting elements.

In a method for spatially resolved measurement of parameters in a cross section of a beam bundle of high-energy radiation of high intensity in which beam components at a location of interest in the beam bundle are coupled out to a measuring device, the above-stated object is met through the following steps:

the beam bundle is shaded through a shading element so that the cross section of the beam bundle is imaged on the shading element;

partial beam bundles having reduced cross section and reduced power density in relation to the beam bundle are coupled out by means of at least one opening in the shading element;

the beam bundle is separated successively in time into variously positioned partial beam bundles by moving the at least one opening of the shading element to different positions within the cross section of the beam bundle to be measured by a movement of the shading element;

measurement values of the partial beam bundle which is transmitted through the at least one opening are acquired successively in time by a measuring device, and the associated position of the partial beam bundle in the cross section of the beam bundle is acquired depending on a given path of the opening resulting from the movement of the shading element; and measurement data comprising measurement values and associated positions of the successively acquired partial beam bundles are stored.

The invention is preferably used for acquisition of measurement values in a beam bundle whose output at the point of measurement is preferably between 10 and 500 W. However, higher outputs at the measuring location are possible. In this regard, the achievable outputs in the intermediate focus differ sharply in different variants of radiation sources and collector systems.

Typical values of EUV in-band power in the intermediate focus in which the use of the invention is strongly recommended for the EUV in-band region (with a center wavelength of $\lambda_0=13.5$ nm with a bandwidth of 2% of the wavelength, i.e., within the spectral region of 13.365 nm to 13.635 nm) are also already present at 10 to 200 W because the EUV out-of-band power (in the wavelength range of $\lambda=5$ to 20 nm) is ten to twenty times the EUV in-band power and likewise acts on the measuring detectors. The total radiant power (including heat radiation) is even up to two to three orders of magnitude higher than the usable EUV in-band power.

The invention is based on the basic idea that the intensity of a beam bundle must be reduced in order to minimize disadvantageous effects such as saturation and accelerated degradation of the detectors which impair measuring accuracy. However, in so doing, a definite spatial correlation of the detected intensities will still be ensured.

To this end, the invention provides that virtually the entire cross section of the beam bundle is shaded, and spatially narrowly defined openings of variable position permit a systematic measurement of partial beam bundles within the cross section of the beam bundle.

The reduction in intensity is achieved on the one hand in that the shading element is positioned in a convergent or divergent region of the beam bundle near an optical node, which can be the point source itself or an image of the source (conjugate source location or intermediate focus), and the measuring device (detector) is arranged at a large distance from the latter (use of the inverse square law or $1/r^2$ law). Accordingly, in the partial beam bundle which is formed, the intensity decreases with increasing distance from the shading element so that a measuring device arranged downstream in the beam path of the partial beam bundle can be outfitted with any conventional detectors in spite of very high power of the radiation source and very high intensity in the beam bundle to be measured. The shading element is arranged at, but not in, an optical node. A reduction in the intensity of the partial beam bundle passing the opening is preferably achieved by arranging the shading element in a divergent portion of the beam bundle.

On the other hand, the reduction in intensity of the original beam bundle also relies upon the additional diffraction and scattering of the partial beam bundle passing through the opening.

The separation of the beam bundle to be measured into partial beam bundles is carried out in that a movement of at least one opening of the element shading the entire cross section of the beam bundle, which movement is not defined concentric to the axis of the beam bundle, implements a systematic scanning (raster scan) of the beam cross section. In so doing, sections from the cross section which are separated depending on position are imaged on the measuring device, and spatially ordered, discrete measurement data are acquired from the sections from the cross section. The separation of the beam bundle to be measured into partial beam bundles through the opening of the shading element is preferably carried out at an intermediate focus. The separation can be carried out, for example, through a rotating or oscillating movement or by means of a translational movement of the shading element. The separation is preferably carried out by means of a rotational movement of the shading element around an axis of rotation parallel to the optical axis (center axis) of the beam bundle. The openings can also be guided over the cross section in random sequence.

If an area that is greater than the cross section of the beam bundle is scanned by means of the path(s) predetermined for the opening(s), this does not have a negative effect on the spatial resolution of the measurement data compiled over the beam cross section. In the event of a displacement of the cross section relative to the scanned area (e.g., due to a misalignment of collector optics), this displacement can be detected and corrected by evaluating the spatial distribution of all of the measurement data of a cross section scan.

With the invention it is possible to carry out radiation measurements inside the cross section of a beam bundle of high-energy, high-intensity radiation allowing spatially highly resolved measurement data to be acquired by conventional optoelectronic sensors without, as a result of high radiation loading, impairing the measuring accuracy through saturation or degradation of the sensors or through parameter fluctuations of attenuators or reflecting elements.

It is possible for a reduction of the intensity of the partial beam bundle passing the opening to be carried out in that the shading element is arranged in a convergent region of the beam bundle in front of the intermediate focus of the radiation source and the measuring device is arranged in a divergent region of the beam bundle behind the intermediate focus.

In an advantageous embodiment of the method according to the invention, a reduction of the intensity of the partial beam bundle passing the opening is achieved by lengthening the propagation path of the partial beam bundle up to the measuring device. This can be carried out, for example, by inserting deflecting optics into the beam path of the partial beam bundle passing the opening.

In a simple embodiment of the method, only one opening is guided over the cross section of the beam bundle at each point in time.

In another embodiment of the method, more than one opening is guided over the cross section of the beam bundle at each point in time. A discrimination of the measurement values of respective partial beam bundles which are generated simultaneously is effected through separate detector regions of the measuring device.

A capture of a measurement value is triggered when the position of the at least one opening on its path has changed relative to a position of a previous capture by an amount which corresponds at least to the extension of the opening in the movement direction. Therefore, measurement values of non-overlapping sections of the cross section of the beam bundle are captured by means of two temporally successive captures.

In an embodiment of the method, the movement of the opening can take place in a step-by-step manner and the measurement values are acquired in the measuring device so as to be synchronized with the movement of the shading element in the pauses between the movements thereof. Further, it is possible that the opening is moved continuously and the measuring device is triggered for the acquisition of measurement values when a predetermined position of the opening is reached.

In an arrangement for the spatially resolved measurement of parameters in a cross section of a beam bundle of high-energy radiation of high intensity, comprising a radiation source which emits a beam bundle to be measured, an element which couples beam components out of the beam bundle, and a measuring device for measuring the beam components coupled out of the beam bundle, the above-stated object is further met in that the element which couples out beam components is constructed as a shading element which has at least one opening and through which the beam bundle to be measured is shaded over its cross section, and the shading element is rotatably arranged in the beam bundle in the vicinity of a source point of the radiation source in order to be able to move the at least one opening on a predetermined path in different regions of the cross section of the beam bundle, and temporally successive partial beam bundles having different positions inside the cross section are directed to the measuring device based on the movement of the opening along the path inside the cross section of the beam bundle behind the at least one opening, the measuring device is arranged downstream of the shading element at a distance such that, for purposes of acquiring measurement values of the high-energy radiation, the partial beam bundles are attenuated to the extent that there is a radiation density which is reduced by a plurality of orders of magnitude relative to the radiation density at the location of the opening in the cross section of the beam bundle, and measuring and controlling means are provided for controlling the shading element for acquiring the position of the at least one opening within the cross section and for associating the measurement values of the partial beam bundles with the different positions of the at least one opening in order to obtain parameters from the cross section of the beam bundle which are measured in a position-dependent manner.

In an embodiment of the arrangement according to the invention which is advantageous because of the technical simplicity of its implementation, the shading element has an axis of rotation which extends outside the optical axis and outside the beam bundle. The shading element is rotatable around the axis of rotation continuously or step by step by means of a drive.

In another embodiment, the shading element can be translationally movable.

It is also possible that the shading element has a plurality of openings which are guided on different paths around the axis of rotation through the cross section of the beam bundle. The openings can be fine holes of equal size or a combination of fine holes and large holes of different size (the term "fine hole" is commonly used in the industry for holes smaller than 3 mm$^2$).

Depending on the purpose of use and the technical parameters of the provided measuring and controlling means, the openings can have equal distances from one another formed by equal angles and radii. In addition, it is also possible that the openings have different distances from one another with different angles and equal radii, or different distances with equal angles and different radii relative to one another.

At least one detector, e.g., photodiodes, cameras having CCD arrays, CMOS arrays, or other two-dimensional arrays, and photon counters, is preferably provided as measuring device.

In an advantageous embodiment of the arrangement according to the invention, a luminescent screen is arranged in front of the measuring device in such a way that a partial beam bundle is imaged on the luminescent screen and the image can be acquired by the measuring device.

It is also advantageous when the measuring device has a beam-deflecting optical element for deflecting the partial beam bundles to a detector arranged outside the optical axis. With an arrangement of this kind, the propagation path of the partial beam bundles is lengthened in an advantageous manner. Further, there are fewer elements along the optical axis which are sensitive to high radiation intensities. A beam-deflecting optical element can be, for example, an optically reflecting metal mirror, a multilayer minor, or a grating. It is very advantageous when the beam-deflecting optical element can be swiveled out of the beam path while the detector is fixedly installed outside the optical axis.

In another advantageous arrangement, the intermediate focus, the beam-deflecting optical element, e.g., a multiplayer minor, and possibly also a detector are arranged on a Rowland circle relative to one another. In so doing, the intermediate focus lies on a circle which is derived from the spherical grating geometry and which has a radius that is equal to a meridional radius of curvature of the multilayer minor and contacts the multilayer mirror in the center of its concave mirror surface. With an arrangement of this kind (Rowland geometry), deviations from a Bragg angle at which a reflection of the beams takes place without displacement of the wavelengths thereof, which deviations occur as a result of the beam divergence generated behind the intermediate focus, can be minimized by a spherical, toroidal, elliptical or parabolic concave mirror having a Rowland geometry. The Bragg angle can be described as the angle of incidence of the radiation to be reflected relative to the reflecting layers. In case of reflections at layers of multilayer structures (symmetric Bragg reflection), the Bragg angle is equal to the angle of incidence of the beams of the beam bundle.

It is further possible to construct a beam-deflecting optical element in such a way that beams proceeding from a point source impinge on the multilayer minor at Bragg angles which correspond to a constant wavelength $\lambda_0$. For example, gradient multilayer coatings can be provided on the beam-deflecting optical element; their layer thickness and spacing of the lattice planes are selected, depending on an aperture of the beam-deflecting optical element, in such a way that all of the beams proceeding from a point source strike the beam-deflecting optical element at Bragg angles for which the spacings of the lattice planes are adapted.

BRIEF DESCRIPTION OF THE DRAWINGS

The invention will be described more fully in the following with reference to embodiment examples and drawings. The drawings show.

DETAILED DESCRIPTION OF THE PREFERRED EMBODIMENTS

Figure 1:
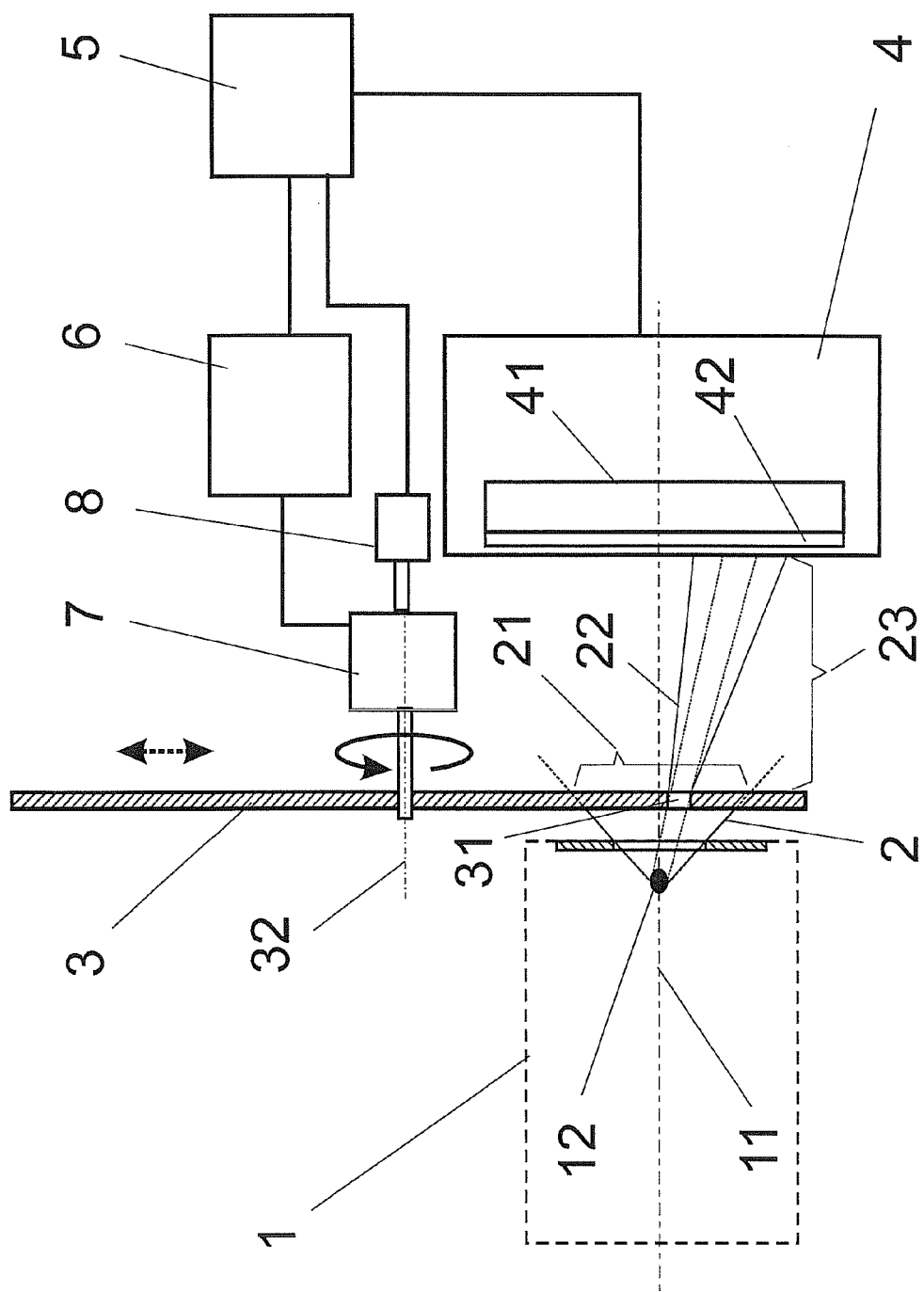
FIG. 1 a schematic diagram of the invention having a shading element in the form of a diaphragm plate which moves at least one opening on different paths through the cross section of a beam bundle to be measured, and with a measuring device which measures parameters of the partial beam bundles which pass the openings(s) at different measuring positions.

The method will be described with reference to the schematic construction shown in FIG. 1.

In the present method, a spatially limited bundle of high-energy radiation which is emitted by a radiation source 1 and which has an intensity (beam bundle 2) is measured with respect to its radiation characteristics (e.g., a spatial intensity distribution) over the beam cross section.

Radiation is emitted by the radiation source 1 (e.g., an EUV radiation source with a 13.5-nm working wavelength) along an optical axis 11 as a beam bundle 2 in the form of a spatially limited radiation cone, assumed for the sake of simplicity, which is possibly also focused through a collector 15 (shown only in FIG. 4) and is available for a measurement of beam parameters in its cross section 21.

A shading element 3 is positioned in the beam bundle 2 following a source location 12 (the original or an optically conjugate source location) and is arranged in the immediate vicinity of the source location 12 in order to determine the radiation characteristics as close as possible to the source (i.e., without additional optical elements interposed therebetween). The shading element 3 is arranged in a divergent region of the beam bundle 2 and is outfitted with a small-area opening 31 through which only a small portion of the beam bundle 2 can pass the shading element 3.

By far the largest proportion of radiation of the beam bundle 2 is eliminated through absorption by the shading element 3. In specific embodiments of the invention, beam components not passing through can also be reflected and can be deflected into a radiation trap (not shown) or used for diagnostic purposes.

The portion of the beam bundle 2 passing the shading element 3 continues as a divergent partial beam bundle 22 whose intensity decreases as the propagation path 23 increases in conformity to the inverse square law ($r^2$ law, where r is the distance from the radiation source 1 or from an intermediate focus 13). In addition, the radiation of the partial beam bundle 22 is diffracted—although only slightly because of the short wavelength of the radiation—at the opening 31, which likewise contributes to the divergence of the partial beam bundle 22.

The partial beam bundle 22 strikes a measuring device 4 at a distance from the shading element 3 and triggers an electric signal proportional to the radiation on a detector 41 at the measuring device 4. The detector 41 is provided with an absorption filter 42.

By means of a defined movement of the opening 31 within the cross section 21 of the beam bundle 2, a successive imaging of sections of the cross section 21 on the measuring device 4 is carried out as a systematic scanning (raster scanning) of the entire cross section 21. For the scanning process, a movement of the shading element 3 takes place in such a way that the opening 31 moves systematically in a scan raster within the cross section 21 of the beam bundle 2.

The shading element 3 extends substantially orthogonal to the optical axis 11 and has an axis of rotation 32 which lies outside the optical axis 11 and outside the beam bundle 2. The opening 31 can accordingly be rotated into the beam bundle 2.

By means of the defined arrangement of opening 31 and axis of rotation 32 relative to the optical axis 11 of the beam bundle 2, the opening 31 traverses the cross section 21 of the beam bundle 2 in a temporally and spatially defined manner during a revolution of the shading element 3.

When the shading element 3 has only one individual opening 31, the axis of rotation 32 is displaced radially (indicated in FIG. 1 by a dashed double arrow) in a stepped manner after each revolution of the shading element 3 in order to systematically scan the cross section 21 of the beam bundle 2.

The small, locally limited portion of radiation of the beam bundle 2 that passes the opening 31 only makes up an almost point-shaped and very small fraction of the cross section 21 to be analyzed. Owing to the divergence of the beam bundle 2 downstream of the source location 12 and due to diffraction at the opening 31, it is spread out and results in a partial beam bundle 22 whose intensity is considerably reduced, e.g., to less than $\frac{1}{1000}$, relative to the intensity of the original beam bundle 2.

The position of the opening 31 is known at every moment based on the known dimensions of the shading element 3 and the systematic rotational movement thereof. Accordingly, a measurement value acquired by the measuring device 4 can be stored in an electronic storage/evaluating unit 5 together with defined position information and can be combined with other measurement values to form a parameter profile (e.g., intensity profile).

As is shown in FIG. 1, the movement for scanning the cross section 21 of the beam bundle 2 is controlled by a control unit 6 and a drive 7, both of which communicate with the shading element 3. The respective position of the shading element 3 is determined by a position-dependent encoder 8 which is coupled with the drive 7.

In alternative embodiments of the invention, the movement of the scan can also be carried out by a stepper motor with or without an encoder 8. Position control can be achieved during the scan by means of a defined quantity of steps executed by the stepper motor, likewise implemented by the control unit 6.

The information about the position in which the partial beam bundle 22 passes through the shading element 3 allows the measurement values to be spatially associated with a determined surface area region in the cross section 21 of the beam bundle 2.

The change in position of the opening 31 results in a new partial beam bundle 22 being generated which is associated with a position inside the cross section 21 of the beam bundle 2.

Accordingly, every position of the opening 31 can be uniquely determined within a suitable coordinate system. In this way, the relative position of the opening 31 within the cross section 21 of the beam bundle 2 is likewise determined and every measurement value can be uniquely associated with exactly one section from the cross section 21. The respective position is determined based on the acquisition by measurement techniques of the position of the drive 7 by means of the encoder 8 of at least one orientation of the shading element 3 which is defined as normal position and on the control commands generated by the control unit 6 for the movement of the shading element 3.

Measurement data comprising a measurement value of the measuring device 4 and a position of the opening 31 are stored electronically in the storage/evaluating unit 5 and are available for subsequent evaluation steps. To obtain a spatial resolution of the measurement data over the cross section 21 of the beam bundle 2, the measurement data of a quantity of partial beam bundles 22 are plotted over their respective associated position. The achievable spatial resolution of the measurement data is reciprocally proportional to the dimensions of the opening 31.

Figure 2:
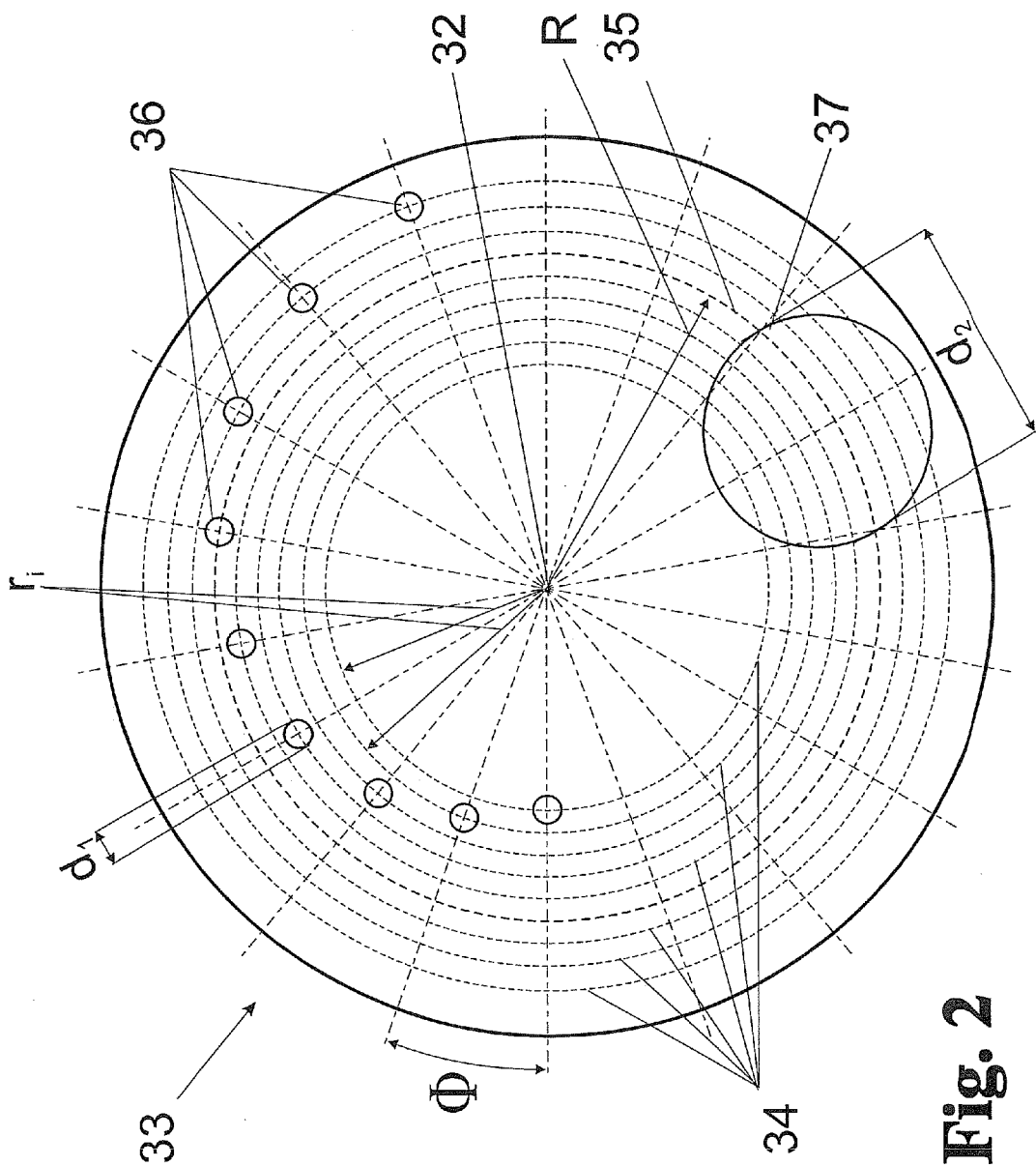
FIG. 2 a construction of the shading element as rotatable diaphragm plate having a plurality of identical openings for generating partial beam bundles on different paths over the cross section of the beam bundle and with a large opening for completely unblocking the beam bundle for machining a workpiece.

In FIG. 1, for purposes of illustrating the measurement principle according to the invention, the shading element 3 whose preferred embodiment is shown in FIG. 2 is in a position in which a very small opening 31 (designated as a fine hole 36 in FIGS. 2 and 4) enters into the cross section 21 of the beam bundle 2.

In another embodiment of the arrangement according to the invention, a plurality of openings 31 can be provided in the shading element 3 (as is shown by way of example in FIG. 2). The partial beam bundle 22 proceeding from the fine hole 36 is imaged in the measuring device 4 on a separate detector 41 (or on a group of closely adjacent detector elements, e.g., a CCD camera). In so doing, it must be ensured that either only an individual partial beam bundle 22 enters the measuring device 4 in its entirety or that a plurality of entering partial beam bundles 22 can be discriminated through a plurality of separate detectors 41 or regions of a detector 41.

In order to additionally attenuate the intensity and/or to limit the intensity by spectrum in the manner of a bandpass filter, an absorption filter 42 can be arranged in front of the detector 41 of the measuring device 4. The absorption filter 42 is preferably arranged directly on the radiation-sensitive surface of the detector 41 of the measuring device 4.

As is shown in FIG. 2, the shading element 3 is constructed as a rotatable diaphragm plate 33 and has a plurality of small openings 31 which are shaped as fine holes 36 of equal size and which are moved on different, non-overlapping paths 34 around the axis of rotation 32 of the diaphragm plate 33. It is advantageous when the individual fine holes 36 are arranged in such a way that only one of the fine holes 36 traverses the cross section 21 of the beam bundle 2 at each point in time and only one partial beam bundle 22 is imaged on the detector 41 per time interval. Further, some or all of the fine holes 36 can have dimensions differing from one another.

By means of the rotation of the diaphragm plate 33 around the axis of rotation 32 which is arranged outside the beam bundle 2 and parallel to the optical axis 11 thereof, the individual fine holes 36 can move on curved, preferably circular paths 34 over the cross section 21 of the beam bundle 2. The fine holes 36 are guided in approximately horizontal or vertical direction inside the cross section 21 of the beam bundle 2.

It is important for the movement of the rotatable diaphragm plate 33 that the individual measurements are carried out with partial beam bundles 22 that image the cross section 21 of the beam bundle 2 with a spatial resolution (e.g., through spatial beam limiting) sufficient for the purpose in question and that do not overlap one another.

When using a CCD camera or a combination of a fluorescent luminescent screen and a VIS camera as measuring device 4, the separation takes place by means of the lateral resolution of the measuring system. With individual diodes, it is ensured that only one hole of the hole raster is illuminated in each instance.

The position(s) of the at least one opening 31 of the shading element 3 can be varied as required over the cross section 21 of the beam bundle 2. However, the individual positions of the openings 31 move regularly along circular or helical paths 34 in every case. The respective opening 31 can move along these paths 34 continuously or by steps.

A large-area detector 41 which is sensitive to the relevant radiation in the beam bundle 2 is used as measuring device 4. But other measuring means which are sensitive to the radiation to be measured can also be used, e.g., CCD arrays or CMOS arrays, diode lines and diode arrays, detectors 41 of different spectral sensitivity (UV cameras, VIS cameras, IR cameras, or the like) which are arranged behind radiation converters or fluorescent luminescent screens 43, or photon counters 412 (as will be described referring to FIG. 5 and FIG. 6).

The shading element 3, as shown in its entirety in FIG. 2, has openings 31 in the form of fine holes 36 of uniform diameter d1 on different circular paths 34 having radii $r_i$. The diameter $d_1$ of the fine holes 36 is adapted to the expected intensity of radiation, to the desired lateral resolution in the plane (measuring plane) to be scanned and to the sensitivity and dynamic range of the measuring device 4. The radii $r_i$ of paths 34 are defined as follows:

$$r_i = r_1 + i - 1(\Delta r) \; (i=1,2,\ldots,n),$$

where n is the quantity of paths 34 and $\Delta r$ is the radial distance between two adjacent paths 34. Exactly one fine hole 36 is located on each path 34. The fine holes 36 on each path 34 are offset relative to one another by an angle Φ resulting in a helical arrangement running from the inside to the outside, and the fine holes 36 are distributed on the diaphragm plate 33 (similar to a Nipkow disk known from television technology).

According to the rotating direction of the diaphragm plate 33, the cross section 21 of the beam bundle 2 is scanned by means of the fine holes 36 guided on paths 34 from the inside outward or from the outside inward, depending on the rotating direction of the diaphragm plate 33. The angle Φ is selected in such a way that only one fine hole 36 is guided over the cross section 21 of the beam bundle 2 at each point in time. The radial distance Δr likewise depends upon the desired lateral resolution and must be selected in such a way that a desired zone which shall be larger than the lateral distribution of radiation intensity to be measured is completely covered by a desired quantity of paths 34.

It is possible to deviate from the helical arrangement of fine holes 36 described above in other embodiments of the invention. Arrangements in which a plurality of fine holes 36 are arranged on one and the same circular path 34 and/or fine holes 36 are arranged on different paths 34 at the same angle of Φ are also possible. The spacing of the individual paths 34 from one another can likewise vary.

By establishing a normal position of the diaphragm plate 33, every fine hole 36 on the diaphragm plate 33 is uniquely defined by specifying an associated angular position and radius $r_i$.

Further, in accordance with the diagram shown in FIG. 2, a large beam-passing region (large hole 37) having a diameter $d_2$ which allows the beam bundle 2 to pass entirely without shading is provided on the diaphragm plate 33. This unobstructed passage of the beam bundle 2 is provided when the beam bundle 2 is to be used for machining workpieces (not shown). The large hole 37 is guided on a large-hole circle 35 with a radius R of the large-hole circle 35 which is calculated by $R = r_1 + (r_n - r_1)/2$.

Naturally, it is also possible to dispense with the large hole 37 entirely. In this case, the diaphragm plate 33 must be swivelable out of the beam path of the beam bundle 2 (together with the measuring device 4) for purposes of machining a workpiece (not shown).

The movement of the diaphragm plate 33 required for scanning the cross section 21 is generated by means of a stepper motor as drive 7. For this purpose, the diaphragm plate 33 is rotated step by step by an angle Φ in such a way that the fine hole 36 which is guided over the cross section 21 at the respective time is moved further in the direction of rotation by an amount corresponding to its diameter $d_1$. All of the other fine holes 36 compulsorily follow by the same amount of angle Φ.

For acquisition of spatially resolved measurement values of the individual partial beam bundles 22, measurement is required at defined times at which the fine holes 36 have been moved by a desired amount which is preferably equal to the extension (e.g., equal to the diameter $d_1$ of the fine holes 36) in the movement direction (tangential direction with respect to the associated path 34).

However, when the diaphragm plate 33 rotates uniformly, the movement direction and movement speed of the fine holes 36, the integration times of the detector 41 of the measuring device 4 and a pulse regime, if any, of the radiation source 1 must be adapted to one another. Further, the times at which the large hole 37 is guided over the cross section 21 of the beam bundle 2 must be synchronized during a measurement cycle with those time intervals in which no radiation arrives at the diaphragm plate 33 (known as burst gaps).

Further, in a modified embodiment the diaphragm plate 33 can also have some or all of the fine holes 36 with different dimensions. In an embodiment of the arrangement according to the invention of this kind, fine holes 36 which do not traverse the center of the cross section 21 of the beam bundle 2 can have a larger diameter so that the signals not measured in the center are measured with the same signal-to-noise ratio as the signals measured in the center. Edge areas of the beam bundle 2 are usually less intensive, but contribute to the total intensity of the radiation due to their large lateral area.

An embodiment for the systematic scanning (raster scanning) of the cross section 21 of the beam bundle 2 is described in the following referring to FIG. 3.

Figure 3:
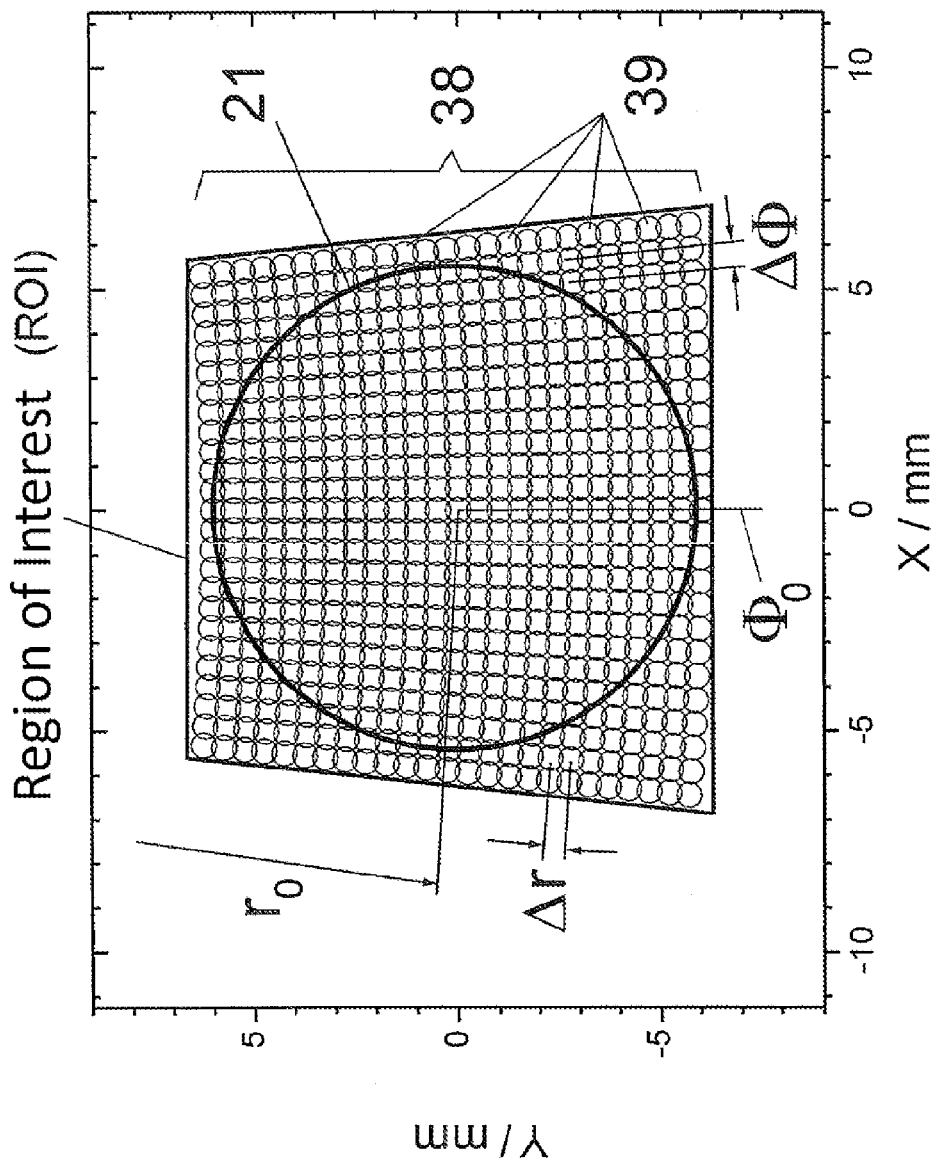
FIG. 3 an advantageous scan raster of the openings which is produced by a plurality of systematically helically offset fine holes on a diaphragm plate.

FIG. 3 illustrates the principle of scanning the cross section 21 of the beam bundle 2 by a shading element 3 in the form of a diaphragm plate 33 according to FIG. 2.

A region of interest (ROI) is defined through the real cross section 21 of the beam bundle 2 in the location of the diaphragm plate 33, while a scan raster 38 which is realized by the progressive movement of the openings 31, assumed to be circular, on different circular paths 34 is selected so as to be somewhat larger so that fluctuations of the beam bundle 2 can also be detected.

The scan raster 38 is formed by the rotation of the diaphragm plate 33 by means of a stepper motor as drive 7 which adjusts the step angle ΔΦ adapted to the spacing between the openings 31 (fine holes 36) by a step or partial step (e.g., half-step mode) of the stepper motor. This results in the separation of scanning points 39 of every opening 31 moving with the diaphragm plate 33 along the respective path 34.

However, during optoelectronic scanning it must be ensured that the region of interest (ROI) embodied by the cross section 21 of the beam bundle 2 to be measured is not larger than the trapezoidal scanning area for which the detectors 41 are read out in a synchronized manner in the measuring device 4. This can be ensured in that an intermediate focus diaphragm 14, or IMF diaphragm 14, which is not larger than the trapezoidal area of the raster is inserted in the beam path near the shading element 3.

In case the dimension of the cross section 21, i.e., the region of the scan raster 38 in which a measurable intensity level occurs, is $\geq \Phi^* r_i$ in the direction of rotation, a subsequent opening 31 would already transmit components of the beam bundle 2 to the measuring device 4 at the same time that a partial beam bundle 22 is directed to the measuring device 4 through the preceding opening 31 which is actually scanning. Referring to FIG. 2, this means that a fine hole 36 already enters the cross section 21 even before the fine hole 36 passing through previous to it has exited the beam cross section 21.

Such a case is only permissible when there are separate detectors 41 (or groups of detectors) in the measuring device 4 which are able to acquire these different partial beam bundles 22 in a spatially separated manner and the passed partial beam bundles 22 do not overlap.

In radial direction, scanning points 39 which exceed a range between $$r_{min} = r_0 - (n-1)/2 \Delta r$$

and $$r_{max} = r_0 + (n-1)/2 \Delta r,$$

are not scanned simultaneously and consequently cannot contribute to critical or corrupting measurement values. In this case, r0 is a radius of the path 34 extending through the center of the region of interest.

When using a stepper motor as drive 7, which was mentioned above, the scanning speed of the fine holes 36 must be synchronized with the pulse frequency of the radiation source 1, and the position of the diaphragm plate 33 must be adjusted for only one pulse of the radiation source 1 in each instance.

In case the encoder 8 is used for measuring the position of the diaphragm plate 33, e.g., if a servomotor is used instead of a stepper motor, the measurement of radiation can be controlled in such a way that the measuring device 4 is triggered by the pulses of the radiation source 1 and the measurement values of the measuring device 4 are stored together with the position supplied by the encoder 8. The x and y coordinates of the scanning point 39 in the scan raster 38 and inside the cross section 21 of the beam bundle 2 can then be determined in the storage/evaluating unit 5 from the position acquired by the encoder 8 and from the known position of the fine holes 36 on the diaphragm plate 33.

Figure 4:
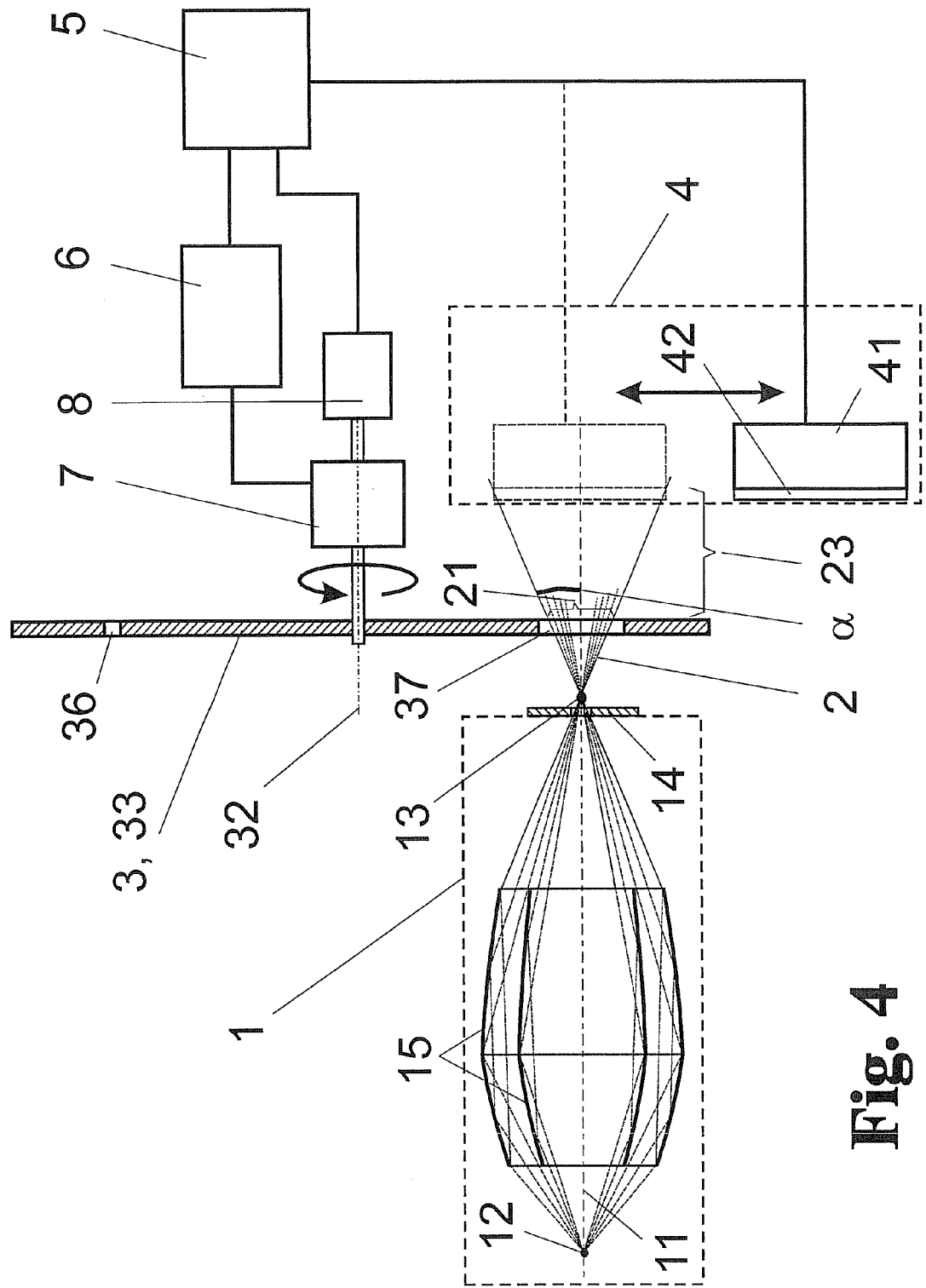
FIG. 4 an embodiment of the invention using a diaphragm plate according to FIG. 2 and a photodiode which can be swiveled into the beam path, shown in the swiveled out state, in the large opening setting of the diaphragm plate.

FIG. 4 shows an embodiment which has been modified from that in FIG. 1. The radiation which is generated in the radiation source 1 and is bundled and shaped through a collector 15 along the optical axis 11 reaches a power of about 200 W in an intermediate focus 13 and accordingly represents a conjugate (secondary) source location. In so doing, the EUV in-band intensity downstream of the collector 15 which passes a real or virtual opening, e.g., an IMF diaphragm 14 (IMF=intermediate focus) having a diameter of 4 mm, is about 1600 W/cm2 in the intermediate focus and decreases again thereafter depending on a divergence angle α of the beam bundle 2.

After the radiation coming from the primary source location 12 has exited the radiation source 1 through the IMF diaphragm 14 (which simultaneously serves to close off a vacuum chamber of the radiation source 1 from the application), the intermediate focus 13 forms the starting point for the divergent beam bundle 2 to be measured. The beam bundle 2 then impinges with its entire cross section 21 in immediate proximity to the intermediate focus 13 on the shading element 3 in the form of a diaphragm plate 33 which largely absorbs the incident radiation energy in a measuring mode and lets a fraction of the radiation pass though only individual fine holes 36.

FIG. 4, on the other hand, shows a particular position of the diaphragm plate 33 at a point in time at which a large hole 37

(see FIG. 2) lets the entire cross section of the beam bundle 2 pass through the diaphragm plate 33. Accordingly, in this position of the diaphragm plate 33 the beam bundle 2 is not subjected to any shading and is available, e.g., for machining a workpiece (e.g., a wafer, not shown). In this example, the diaphragm plate 33 used as shading element 3 is arranged after the intermediate focus 13 but can also be arranged close to the intermediate focus 13 and can nevertheless make use of the subsequently occurring divergence of the beam bundle 2 to reduce the radiation density.

In the embodiment according to FIG. 4, the detector 41 is arranged so as to be movable laterally with respect to the optical axis 11 and is swiveled out of the beam bundle 2 for the position of the large hole 37 of the diaphragm plate 33 described above. Consequently, FIG. 4 shows only the possibility of implementing a machining mode for the beam bundle 2 for the measuring method according to the invention. In this example, an EUV-sensitive detector 41 is used as measuring device 4 and is additionally provided with an absorption filter 42 for eliminating falsifying out of-band spectral components and, if required, for attenuation of the partial beam bundle 22 which is let through in the measuring mode (when the detector 41 is swiveled into the optical axis 11).

An equivalent solution for enabling the entire beam bundle 2 as is shown in FIG. 4 further consists in that the diaphragm plate 33—in case it has no large hole 37—is swiveled out (not shown) of the optical axis 11 together with the measuring device 4 and, in this way, the entire beam bundle 2 is applied without obstruction.

Figure 5:
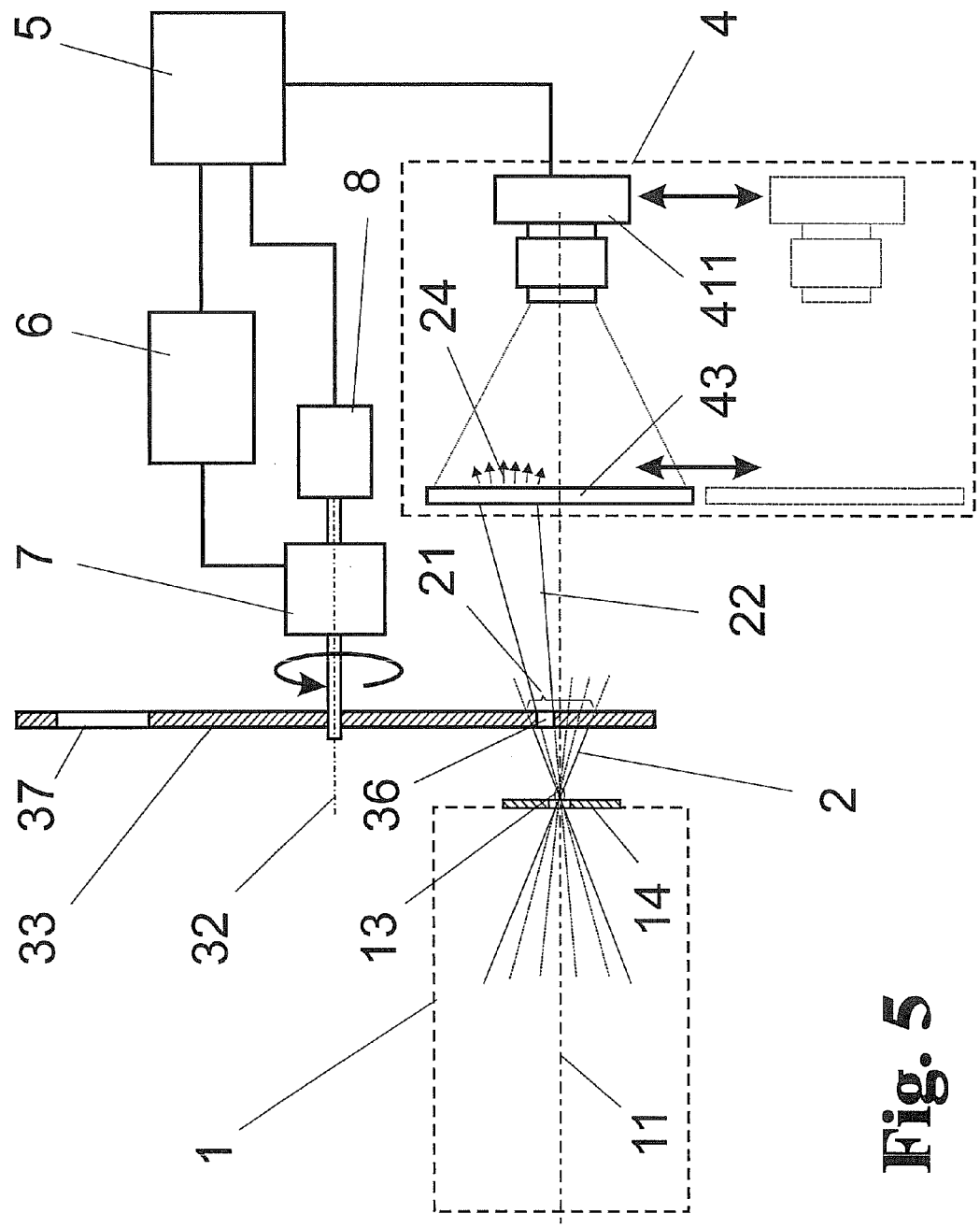
FIG. 5 an expanded embodiment of the invention with respect to the basic construction shown in FIG. 1 having a luminescent screen whose secondary radiation is captured by a conventional (VIS) camera.

In another embodiment according to FIG. 5, the partial beam bundles 22 generated through the rotating diaphragm plate 33 are imaged on a luminescent screen 43 which transforms the incident radiation (e.g., high-energy laser radiation, X-ray radiation, EUV radiation, etc.) of the partial beam bundle 22 into a secondary radiation 24 (generated, e.g., by fluorescence, luminescence, etc.) and the emitted secondary radiation 24 is captured by a camera 411. In so doing, a further attenuation of the intensive high-energy radiation of the partial beam bundles 22 and a transformation of the wavelength region (e.g., into the visible spectral region—VIS, or the like) can advantageously be achieved so that conventional CCD cameras can be used. The latter allow a high spatial resolution and, therefore, make it possible to measure a plurality of separable partial beam bundles 22 simultaneously (shorter measuring time for measuring the entire beam bundle 2) in case the secondary radiation 24 of different partial beam bundles 22 is spatially separated with sufficient clarity. In case of very weak secondary radiation 24, a photon counter 412 (PMT or SEV shown in FIG. 6 and FIG. 7) can also be used instead of camera 411.

Figure 6:
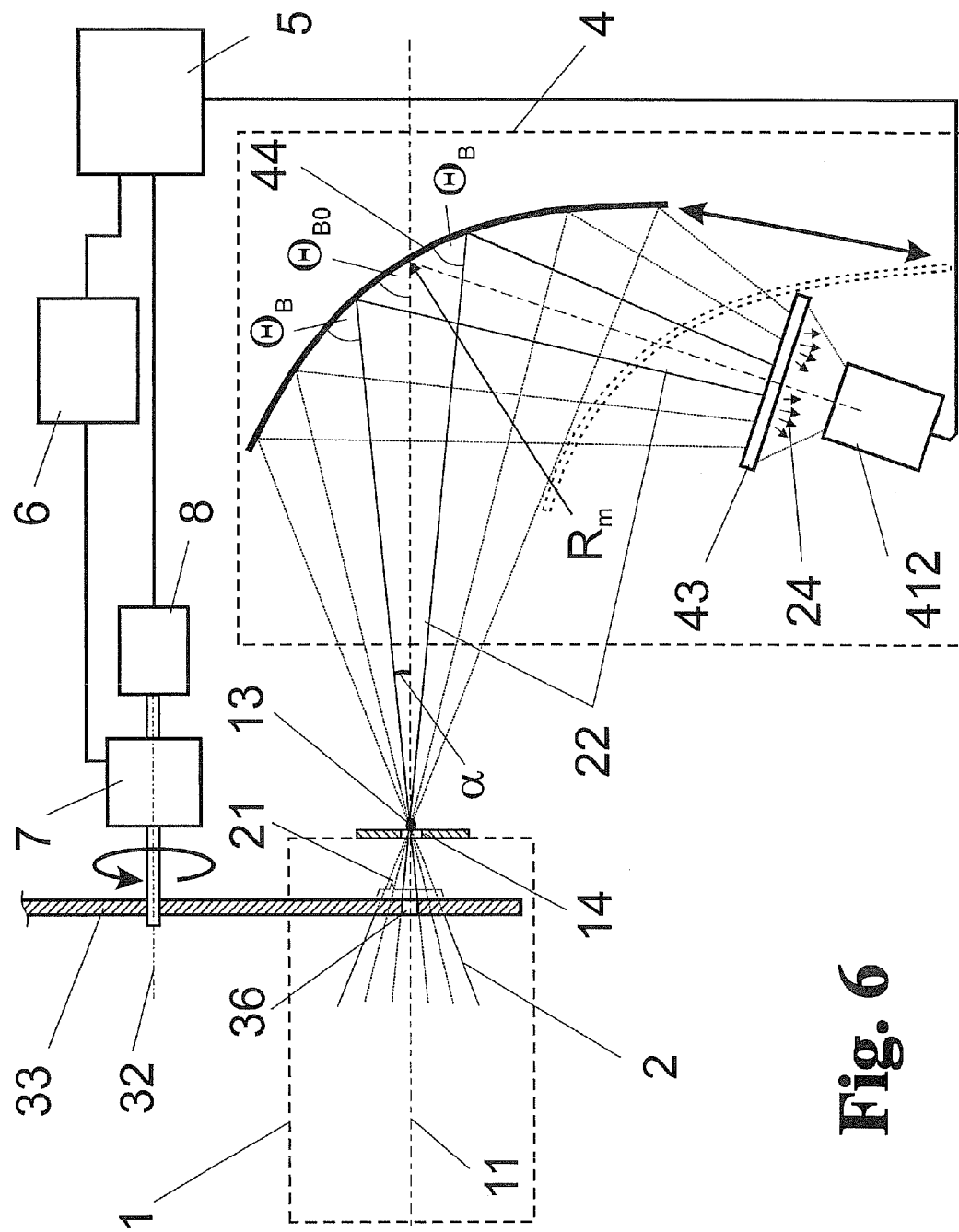
FIG. 6 a second embodiment of the invention using a diaphragm plate according to FIG. 2 and a beam-deflecting mirror which can be swiveled out.

In the embodiment according to FIG. 6, in which it is assumed that the radiation source 1 emits extreme ultraviolet (EUV) radiation, a reflecting optical element in the form of a multilayer mirror 44 suitable for EUV radiation couples out the successive partial beam bundles 22 passing through the shading element 3 to a fluorescent luminescent screen 43 which is arranged laterally with respect to the optical axis 11. A photon counter 412 is arranged downstream of the multilayer mirror 44 in direction of the beam path coupled out by the multilayer minor 44. The diaphragm plate 33 is arranged in a convergent region of the beam bundle 2 and in front of an IMF diaphragm 14. The multilayer minor 44 can also generally be replaced by other beam-deflecting means such as metal minors with grazing incidence or gratings.

The embodiment of the invention having a concave multilayer mirror 44 according to FIG. 6 concerns a refocusing system which offers the advantage of spectral filtering with improved suppression of out-of-band radiation. However, the reflecting system also reduces the in-band radiation in proportion to the reflective characteristics of the multilayer minor 44.

When measuring with multilayer systems in a divergent region of the beam bundle 2 downstream of an intermediate focus 13, it must be considered that the divergent beam path leads to different Bragg angles $\theta_B$ at a mirror surface and to corresponding wavelength shifts.

One approach for solving this problem consists in using a multilayer minor 44 which is formed as a gradient multilayer minor (gradient multilayer coating) having double layers, in which the layer thicknesses change along the aperture depending on position and on which—for a point light source—all rays impinge on the multilayer mirror 44 at a Bragg angle $\theta_B$ when the layer thicknesses of the double layers conform for every location to the diffraction plane spacing (d-spacing) for a Bragg reflection required for the incident angle at the respective location of the multilayer minor 44.

Figure 7:
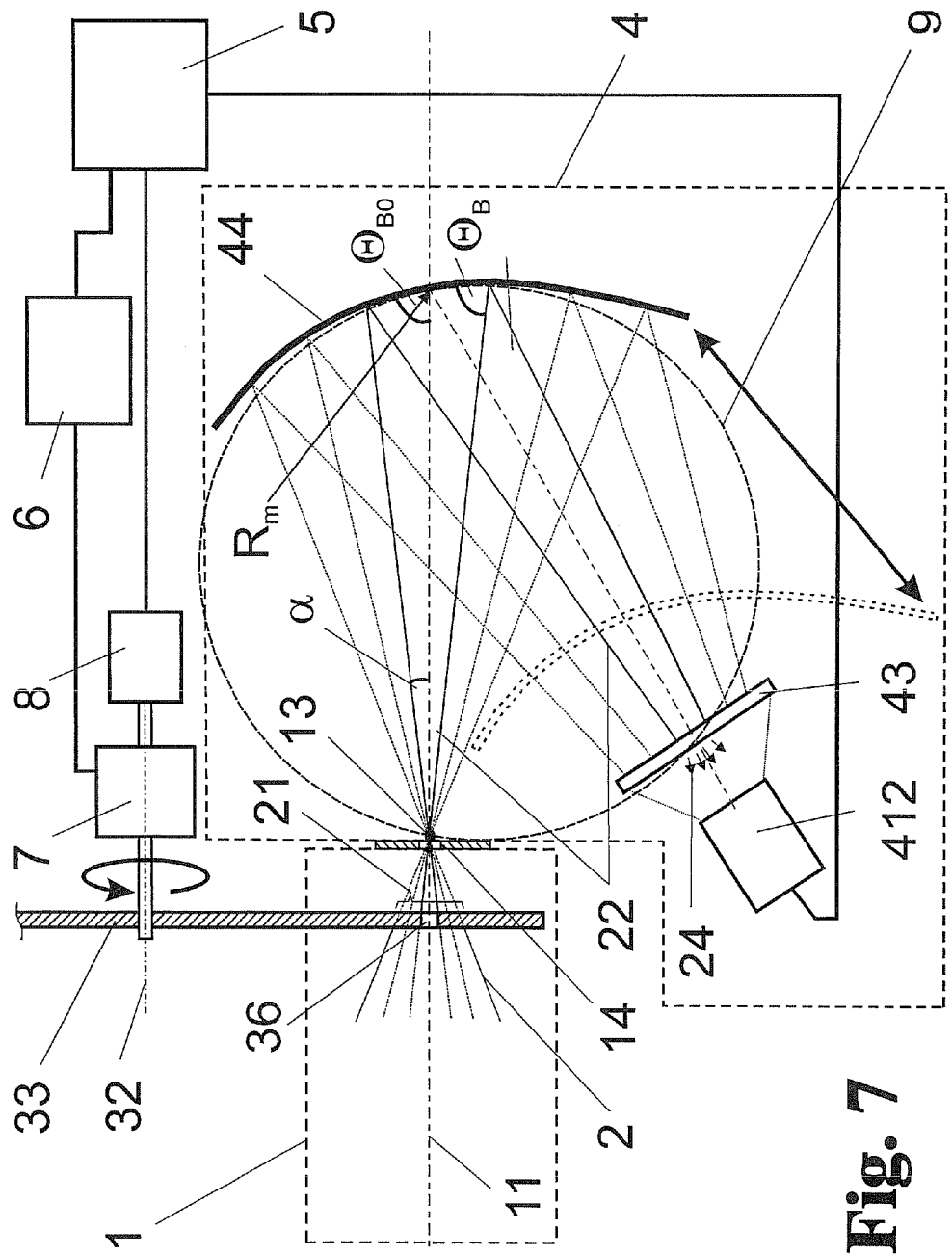
FIG. 7 a third embodiment of the invention in which an intermediate focus, a deflecting optical element and a detector are arranged on a Rowland circle.

Another solution is to arrange the multilayer mirror 44, the intermediate focus 13 and the detector 41 on a Rowland circle 9 (indicated in dashes in FIG. 7). This arrangement corresponds to a meridional 1:1-imaging of the intermediate focus 13 located on the Rowland circle 9 in an image plane (of the detector 41) which is likewise located on the Rowland circle 9.

The Rowland circle 9 is a circle having a diameter which is equal to the meridional radius Rm of curvature of the multilayer mirror 44 and contacts the multilayer minor 44 in the center of its concave mirror surface (Rowland geometry).

The distance of the intermediate focus 13 from the center of the multilayer mirror 44 is equal to $R_m*\sin(\theta_{B0})$, where $\theta_{B0}$ is the central Bragg angle (the angle of incidence of the center beam of the beam bundle 2 measured relative to the tangential plane at the reflecting surface of the multilayer mirror 44) for a beam impinging on the multilayer mirror 44 directly along the optical axis 11. For all rays impinging outside the optical axis 11, a relationship of the deviation $\sigma(\alpha)$ of the Bragg angle $\theta_B$ from the central Bragg angle $\theta_{B0}$ depending on a meridional divergence angle $\alpha$ of the divergent region of the beam bundle 2 can be approximated as follows:

$$\sigma(\alpha)=1/(2 \cdot \tan(\theta_{B0})) \cdot \alpha^2 \; (\alpha \text{ in rad}).$$

This results in the following deviations $\sigma(\alpha)$ for the center wavelength $\lambda_0=13.5$ nm for the divergence half-angle $\alpha_{max}=16°=0.28$ rad:

| $\theta_{B0}$ | $\alpha_{max}$ | $\sigma(\alpha_{max})$/rad | $\Delta\lambda = \lambda_0 *\sigma/\tan\theta_0$ |
|---|---|---|---|
| 45° | 16° | 0.0392 (2.25°) | 0.53 nm |
| 60° | 16° | 0.0226 (1.30°) | 0.18 nm |
| 70° | 16° | 0.0143 (0.82°) | 0.07 nm |
| 80° | 16° | 0.0069 (0.40°) | 0.016 nm |

Accordingly, the deviation $\sigma(\alpha)$ from the central Bragg angle $\theta_{B0}$ can be sharply reduced by arranging a spherical or toroidal concave multilayer minor 44 and the intermediate focus 13 in Rowland geometry.

Further, in Rowland geometry it is still necessary to take into account the fact that the intermediate focus 13 does not present a point light source, so that the not insignificant size of the intermediate focus for non-central starting points of the rays from the intermediate focus 13 lead to Bragg angles $\theta_B$ which diverge from the central Bragg angle $\theta_{B0}$. Depending on the actual shape and dimensioning of the intermediate focus 13, this can cause significant wavelength shifts through a Bragg angle shift ($\theta_B$-$\theta_{B0}$). It is possible to introduce a calibration factor to show the ratio between a measurement value and an actually incident in-band energy. However, as long as the meridional width of the intermediate focus 13 contributes to the measurement value of the detector 41 (photon counter 412 in FIG. 6), there remains a deviation of the Bragg angle $\theta_B$ which leads to an unwanted variance of the calibration factor.

The geometric influence of the source size on the Bragg angle θB at the multilayer minor 44 can be corrected by means of the calibration factor only if it is possible to distinguish what proportion of a measurement value supplied by the detector 41 is associated with what lateral position inside the intermediate focus 13.

It is precisely this prerequisite that is met in the arrangement according to the invention when the diaphragm plate 33 having small openings 31 (fine holes 36 according to FIG. 2) scans the intermediate focus 13 successively at different scanning points 39 and the respective positions of the scan points 39 are known. Therefore, a multilayer mirror 44 in Rowland geometry is suitable for highly spatially resolved scanning of a high-energy radiation within a narrowly limited spectrum such as EUV radiation in the spectral band of 13.5 nm±2% because all measurement errors can be corrected to a sufficient extent and, therefore, reduced.

In a further embodiment of the arrangement according to the invention, a special gradient multilayer coating of the multilayer mirror 44 can be used in which the layer thickness changes depending on the aperture of the multilayer mirror 44 and all rays emitted by a point light source (intermediate focus 13) impinge on the multilayer minor 44 at Bragg angles $\theta_B$ for which the layer spacing of the double layers is adapted.

Further, in the embodiment of the measuring device 4 according to FIG. 6, the use of a multilayer mirror 44 is best suited to a machining mode of the beam bundle 2 because exclusively the multilayer mirror 44 need be arranged so as to be movable laterally with respect to the optical axis 11 in order to allow an unobstructed beam bundle 2 to pass through a large hole 37 of the diaphragm plate 33 as is shown in FIG. 4.

According to FIG. 6, a photodiode or a camera 411 having a luminescent screen 43 arranged in front of it, as is shown in FIG. 5, or without a luminescent screen 43, as can be seen from FIG. 4, can also be used instead of the photon counter 412.

The method according to the invention and the arrangements described above allow highly spatially resolved measurements to be carried out in a simple manner in a beam path conveying high outputs and, in so doing, also allow the use of conventional optoelectronic measuring apparatus (e.g., a CCD camera). Further, the beam parameters actually present in the cross section 21 of a beam bundle 2 can be measured directly in a position-oriented manner. A swivelable arrangement of the measuring device 4 or of individual parts thereof (such as mirrors, gratings, other elements for coupling out radiation, or detectors 41 and possibly luminescent screens 43) facilitates maintenance of a vacuum which is needed for generation and application of EUV radiation because the measuring device 4 can remain completely inside the vacuum chamber (represented by a dashed line of the radiation source 1).

The invention can be used in a wide range of applications for the measurement of beam bundles, particularly for checking beam quality in installations for EUV lithography and laser machining.

REFERENCE NUMERALS

1 radiation source
11 optical axis
12 source location
13 intermediate focus
14 IMF diaphragm
15 collector
2 beam bundle
21 cross section
22 partial beam bundle
23 propagation path
24 secondary radiation
3 shading element
31 opening
32 axis of rotation
33 diaphragm plate
34 paths (of the openings around the axis of rotation)
35 large-hole circle
36 fine hole
37 large hole
38 scan raster
39 scanning points
4 measuring device
41 detector
411 camera
412 photon counter
42 absorption filter
43 luminescent screen
44 multilayer mirror
5 storage/evaluating unit
6 control unit
7 drive
8 encoder
9 Rowland circle
α divergence angle
$\theta_B$ Bragg angle
$\theta_{B0}$ central Bragg angle
Φ angle
ΔΦ step angle
$R_m$ meridional radius
$d_1$ diameter (of the fine holes 36)
$d_2$ diameter (of the large hole 37)
R radius (of the large hole circle 37)
$r_i$ radii (of the paths 34)
$r_0$ radius
Δr radial distance

What is claimed is:

1. A method for spatially resolved measurement of parameters in a cross section of a beam bundle of high-energy radiation of high intensity in which beam components at a location of interest in the beam bundle are coupled out to a measuring device, comprising the following steps:

shading the beam bundle through a shading element so that the cross section of the beam bundle is imaged on a shading element;

coupling out partial beam bundles having a reduced cross section and reduced intensity in relation to the beam bundle by means of at least one opening in the shading element;

successively separating the beam bundle in time into variously positioned partial beam bundles through movement of the at least one opening of the shading element to different positions within the cross section of the beam bundle to be measured by a movement of the shading element;

successively acquiring measurement values of the partial beam bundles in time by a measuring device, the partial beam bundles being transmitted through the at least one opening, and acquiring an associated position of the partial beam bundles in the cross section of the beam bundle depending on a given path of the opening resulting from the movement of the shading element; and storing measurement data comprising measurement values and associated positions of the successively acquired partial beam bundles.

2. The method according to claim 1, wherein separating the beam bundle to be measured into the partial beam bundles through the opening of the shading element is carried out at an intermediate focus of a radiation source emitting the beam bundle.

3. The method according to claim 1, wherein separating the beam bundle to be measured into the partial beam bundles through the opening is carried out by a rotational movement of the shading element around an axis of rotation parallel to an optical axis of the beam bundle.

4. The method according to claim 1, further comprising reducing the intensity of the partial beam bundle passing the opening by arranging the shading element in a divergent region of the beam bundle.

5. The method according to claim 1, further comprising reducing the intensity of the partial beam bundle passing the opening by arranging the shading element in a convergent region of the beam bundle in front of an intermediate focus of a radiation source emitting the beam bundle, and arranging the measuring device in a divergent region of the beam bundle behind the intermediate focus.

6. The method according to claim 1, further comprising reducing of the intensity of the partial beam bundle passing the opening by lengthening a propagation path of the partial beam bundle up to the measuring device.

7. The method according to claim 1, further comprising guiding one opening over the cross section of the beam bundle at each point in time.

8. The method according to claim 1, further comprising guiding more than one opening over the cross section of the beam bundle at each point in time, and simultaneously generating a discrimination of the measurement values of respective partial beam bundles through separate detector regions of the measuring device.

9. The method according to claim 1, further comprising triggering a capture of a measurement value when the position of the at least one opening on its path has changed relative to a position of a previous capture by an amount which corresponds at least to an extension of the opening in a movement direction.

10. An arrangement for spatially resolved measurement of parameters in a cross section of a beam bundle of high-energy radiation of high intensity, comprising:

a radiation source emitting a beam bundle to be measured;
an element for coupling beam components out of the beam bundle, and
a measuring device for measuring the beam components coupled out of the beam bundle; wherein the element for coupling out beam components being constructed as a shading element with at least one opening by which the beam bundle to be measured is shaded over an entire cross section except for the at least one opening;

the shading element being rotatably arranged in the beam bundle in a vicinity of a source point of the radiation source to move the at least one opening along a predetermined path in different regions of the cross section of the beam bundle, wherein temporally successive partial beam bundles having different positions inside the cross section are directed to the measuring device dependent on the movement of the opening along the path inside the cross section of the beam bundle behind the at least one opening;

the measuring device being arranged downstream of the shading element at such a distance that the partial beam bundles are attenuated to an extent that there is an intensity of radiation which is reduced by two or more orders of magnitude relative to an intensity at the location of the opening in the cross section of the beam bundle; and measuring and controlling means for controlling the shading element for acquiring a position of the at least one opening within the cross section and for associating the measurement values of the partial beam bundles with different positions of the at least one opening to obtain parameters from the cross section of the beam bundle which are measured in a position-dependent manner.

11. The arrangement according to claim 10, wherein the shading element has an axis of rotation disposed outside of an optical axis of the beam bundle.

12. The arrangement according to claim 10, wherein the shading element has a plurality of openings which are guided along different paths around an axis of rotation through the cross section of the beam bundle.

13. The arrangement according to claim 12, wherein the openings are fine holes of equal-size.

14. The arrangement according to claim 13, wherein the shading element, in addition to the fine holes, is provided with at least one large hole of different size to pass significant or all portions of the beam bundle through.

15. The arrangement according to claim 10, wherein the measuring device has a detector and a luminescent screen arranged in front of the detector.

16. The arrangement according to claim 10, wherein the measuring device has a beam-deflecting optical element for deflecting the partial beam bundles to a detector arranged outside of an optical axis of the beam bundle.

17. The arrangement according to claim 16, wherein an intermediate focus of the radiation source, a multilayer mirror and the detector are arranged on a Rowland circle which contacts the multilayer mirror in the center of its concave mirror surface.

* * * * *